(12) United States Patent
Kim et al.

(10) Patent No.: US 8,582,481 B2
(45) Date of Patent: Nov. 12, 2013

(54) LOWMOB AND DLOWMOB SYSTEM

(75) Inventors: Ki Hyung Kim, Suwon-si (KR); Bag Gargi, Suwon-si (KR); Seung-Wha Yoo, Seoul (KR); Muhammad Taqi Raza, Suwon-si (KR)

(73) Assignee: Ajou University Industry-Academic Cooperation Foundation, Suwon-si, Gyeonggi-do (KR)

( * ) Notice: Subject to any disclaimer, the term of this patent is extended or adjusted under 35 U.S.C. 154(b) by 531 days.

(21) Appl. No.: 12/841,233

(22) Filed: Jul. 22, 2010

(65) Prior Publication Data

US 2011/0176469 A1 Jul. 21, 2011

(30) Foreign Application Priority Data

| Jan. 21, 2010 | (KR) | 10-2010-0005582 |
| Jan. 21, 2010 | (KR) | 10-2010-0005583 |
| Mar. 25, 2010 | (KR) | 10-2010-0026914 |

(51) Int. Cl.
*H04W 4/00* (2009.01)

(52) U.S. Cl.
USPC .......................................... 370/311; 455/436

(58) Field of Classification Search
USPC .......... 370/328, 331, 338, 401, 311; 455/436, 455/437, 438, 439, 442, 443, 444
See application file for complete search history.

(56) References Cited

U.S. PATENT DOCUMENTS

| 7,016,325 B2 * | 3/2006 | Beasley et al. | 370/331 |
| 7,395,074 B2 * | 7/2008 | Syrjarinne | 455/456.1 |
| 7,646,781 B2 * | 1/2010 | Campion et al. | 370/412 |
| 7,706,337 B2 * | 4/2010 | Pandey et al. | 370/338 |
| 8,077,684 B2 * | 12/2011 | Tchigevsky | 370/338 |
| 8,107,423 B2 * | 1/2012 | Hung | 370/328 |
| 8,248,963 B2 * | 8/2012 | Kim et al. | 370/252 |
| 2007/0147405 A1 * | 6/2007 | Kuurne | 370/412 |
| 2007/0160074 A1 * | 7/2007 | Yamaguchi et al. | 370/442 |
| 2009/0185538 A1 * | 7/2009 | Choi et al. | 370/331 |
| 2010/0093287 A1 * | 4/2010 | Higuchi et al. | 455/67.13 |
| 2011/0105132 A1 * | 5/2011 | Vasudevan et al. | 455/448 |

* cited by examiner

*Primary Examiner* — Ricky Ngo
*Assistant Examiner* — Christine Ng
(74) *Attorney, Agent, or Firm* — Sherr & Jiang, PLLC

(57) ABSTRACT

A LoWMob (LoWPAN Mobility: Low power Wireless Personal Area Network) system comprises a mobile node, at least one sensor node, a border node and a gateway. The mobile node configured transmits at least one data packet within an MST (Maximum Sleep Time). The mobile node corresponds to an FFD (Full Function Device) or an RFD (Reduced Function Device). The at least one sensor node is configured to be densely to a degree that a transmission range overlaps and configured to be able to measure a moving direction of the mobile node. The boarder node is configured to be arranged at a periphery of the PAN and configured to turn off a transceiver in a quasi-sleep state. The gateway is directly connected with a first least part of the at least one sensor node.

12 Claims, 13 Drawing Sheets

FIG. 5

1. σ = observed link quality with MN and α
2. IF (σ < τ)
3.     DO
4.         α determines AoA of the signal
5.             determine the angle 'θ' between MN and itself
6.             determine distance 'd' between MN and itself
7.             X = sin(θ * π) * d
8.             Y = cos(θ * π) * d
9.     WHILE (σ exists)
10.     activate next SN, φ
11.        send *new_node* message to φ
12.        IF φ receives *new_node*
13.            broadcast *hello_packet* at 1ms
14.            send LU to γ
15.               IF γ receives LU
16.                  update *association_node* = φ
17.        IF MN receives *hello_packet*
18.            send *association_request* to φ
19.        IF φ receives *association_request* from MN
20.            send *new_node* to α
21.        ELSE broadcast *MN_Lost* message
22.            IF *MN_lost* found by SN
23.                re-broadcast *message_lost* meesage
24.        IF α receives *new_node* from φ
25.            forward packets destined for MN to φ
26.            IF MN's packet queue is empty at α
27.                switch to sleep mode

*where*
a. α = SN
b. τ = Threshold value for the link
c. X = x-coordinates of MN
d. Y = y-coordinates of MN
e. Φ = SN near X, Y coordinates
f. γ = Gateway

FIG. 11

| Dispatch value | Message types |
|---|---|
| 01 000111 | Join_request |
| 01 001011 | Association_request |
| 01 001001 | New_node |
| 01 000110 | GW-MN (Data packet from GW to MN) |
| 01 001111 | MN-GW (Data packet from MN's associated SN to GW) |
| 01 000111 | LU (Location update packet) |
| 01 010001 | MN-MN (Data packet from source MN to destination MN) |

LOWMOB AND DLOWMOB SYSTEM

CROSS-REFERENCE TO RELATED APPLICATIONS

This application claims priority under 35 USC §119 to Korean Patent Applications No. 2010-0005582, filed on Jan. 21, 2010, No. 2010-0005583, filed on Jan. 21, 2010, and No. 2010-0026914, filed on Mar. 25, 2010 in the Korean Intellectual Property Office, the disclosure of which are all incorporated herein in their entirety by reference.

TECHNICAL FIELD

The described technology relates generally to a LoWMob (LoWPAN Mobility) system and more particularly to the LoWMob system capable of providing seamless service with a moving mobile node.

BACKGROUND

The IEEE 802.15.4 standard [1] has emerged as a strong technology for Wireless Sensor Networks (WSNs) to morph Personal Area Networks (PANs) into Low power Wireless Personal Area Networks (LoWPANs). LoWPANs are characterized by low data rates, low power consumption, low costs, autonomous operations, and flexible topologies. In order to fully realize a pervasive or ubiquitous environment, LoWPANs must be connected to the Internet. Internet Engineering Task Force (IETF) is standardizing the transmission of IPv6 over LoWPANs through 6lowpan (IPv6 over Low power Wireless Personal Area Networks) working group [2]. The emerging application range of 6LoWPAN includes consumer appliances, home automation, monitoring and control in industrial environments, military, and environmental monitoring, etc.

Incorporating mobility in 6LoWPAN [3] can lead to the realization of new and exciting applications. For example, mobility of 6LoWPAN devices can be exploited in health care applications. In this case, the patients have sensor nodes embedded in their clothes for sensing some of their important health parameters like pulse rate and temperature, etc. These sensor nodes can sense the data and transmit it to a monitoring facility, even when the patient is moving, by using one of the existing communication technologies like WLAN and UWB. However, these technologies are more applicable when the application requires high data rate and often demand complex link and physical layer solutions with complicated hardware. 6LoWPAN has been considered as the most suitable technology for supporting mobility in sensor networks due to their low power and low data rate characteristics. Also, 6LoWPAN enables the integration of IEEE802.15.4 networks with the Internet, thereby increasing the monitoring scope of the patient.

In order to prevent packet losses due to mobility, some of the existing tunnel-based mobility protocols like HMIPv6 [4], FMIPv6 [5], and MIPv6 [5] can be used. These schemes can help a Mobile Node (MN) to maintain its ongoing communication with the outer world and to minimize the packet losses while it is moving. However, the above mentioned schemes are host-based mobility protocols in which the MN actively participates in mobility-related signaling. Moreover, these are network layer solutions that provide mobility-related features at the IP layer. In other words, mobility-related packets are carried by the IP traffic [6]. Similarly, routing-based mobility management schemes like HAWAII [7] and Cellular IP [5] require the MN to manage its mobility by sending path-setup messages and periodic path-refresh messages [7]. Also, in HAWAII, the domain router could become a potential bottleneck, as all of the MN's packets are routed through it. Another mobility support protocol is NEMO that requires a mobile router (MR) to support the mobility of a PAN [8].

PMIPv6 [9] is a network-based mobility support protocol currently being standardized by IETF's netlmm (Network-based localized mobility management protocol) working group. PMIPv6 could be considered as a suitable candidate to enable mobility in 6LoWPAN devices, as in the scheme the network handles all the mobility-related signaling on behalf of MNs. However, at its current phase, PMIPv6 defines the interface between the Mobile Access Gateway (MAG) and a MN for one-hop communication at the network layer. It does not specify the interface between MN and MAG for multi-hop communication. Also the mobility-related packets exchanged between network entities are carried by IP traffic. Moreover, PMIPv6 demands another level of tunneling overhead at the network layer between the Gateway (GW) and the MAG that serves MNs.

SUMMARY

In one embodiment, a LoWMob (LoWPAN Mobility: Low power Wireless Personal Area Network) system comprises a mobile node, at least one sensor node, a border node and a gateway. The mobile node configured transmits at least one data packet within an MST (Maximum Sleep Time). The mobile node corresponds to an FFD (Full Function Device) or an RFD (Reduced Function Device) and the mobile node is capable of moving a PAN (Personal Area Network). The at least one sensor node is configured to be densely to a degree that a transmission range overlaps and configured to be able to measure a moving direction of the mobile node wherein one of the at least one sensor node operates as an associated sensor node and the associated sensor node measures a distance of the mobile node. The boarder node is configured to be arranged at a periphery of the PAN and configured to turn off a transceiver in a quasi-sleep state and transmit a beacon in an active state to the mobile node, the beacon includes a sensor node address and a PAN identifier. The gateway is directly connected with a first least part of the at least one sensor node and corresponds to an intermediate point when the mobile node and/or the at least one sensor node communicate with an external device outside the PAN.

The associated sensor node may measure the distance based on an RSSI (Received Signal Strength Indication).

A second least part of the at least one sensor node may include an antenna array in order to measure the moving direction of the sensor node.

The antenna array may obtain an AoA (Angle of Arrival) of the mobile node.

The mobile node may determine whether the mobile node enters a new PAN when the beacon is received, and transmit a join request message to a sensor node directly associated by the mobile node when the mobile node enters the new PAN.

The associated sensor node may activate a next appropriate sensor node based on the moving direction of the mobile node for a handoff procedure when a link quality between the mobile node and the associated sensor node may decrease under a predetermined threshold.

In another embodiment, a DLoWMob (Distributed LoW-PAN Mobility: Distributed Low power Wireless Personal Area Network) system managing a PAN including at least one region comprises a MSP (Mobile Service Point), a mobile node, at least one sensor node and a gateway. The MSP is configured to manage one of the at least one region. The mobile node is configured to transmit at least one data packet within an MST (Maximum Sleep Time). The mobile node corresponds to an FFD (Full Function Device) or an RFD (Reduced Function Device) and the mobile node is capable of moving a PAN (Personal Area Network). The at least one sensor node is configured to be densely to a degree that a transmission range overlaps and configured to be able to measure a moving direction of the mobile node wherein the at least one sensor node is associated with the MSP. One of the at least one sensor node operates as an associated sensor node and the associated sensor node measures a distance of the mobile node. The gateway is connected with the MSP and corresponding to an intermediate point when the mobile node and/or the at least one sensor node communicate with an external device outside the PAN.

The MSP may manage binding information between the mobile node and the associated node to reduce LU (Location Update) message sent to the gateway.

A first MSP managing a first region in the at least one region may communicate with a second MSP managing a second region in the at least one region directly or via at least one other MSP.

The mobile node may transmit the data packet to a MSP in the second region directly or via at least one other MSP when the mobile node in the first region transmits the data packet to an opponent node corresponding to a mobile node, a sensor node or MSP in the second region.

The associated sensor node may activate a next appropriate sensor node based on the moving direction of the mobile node for a handoff procedure when a link quality between the mobile node and the associated sensor node decreases under a predetermined threshold.

The associated sensor node may transmit a new_node message including an ID of the mobile node to the next appropriate sensor node, and transmit a LU message to a MSP managing the next appropriate sensor node.

In still other embodiment, a LoWMob (LoWPAN Mobility: Low power Wireless Personal Area Network) system comprises an inner border node, an outer border node, a mobile node and at least one sensor node. The inner border node and the outer border node are arranged in the PAN and configured to turn off a transceiver in a quasi-sleep state and transmit a beacon in an active state to the mobile node. The outer node transmits the beacon more frequently than the inner node. The mobile node is configured to request the outer node or the inner node for an ID of the mobile node when data transmission is not occurred within an MST (Maximum Sleep Time). The mobile node is capable of moving a PAN (Personal Area Network). The at least one sensor node is configured to be densely to a degree that a transmission range overlaps and configured to be able to measure a moving direction of the mobile node wherein one of the at least one sensor node operates as an associated sensor node and the associated sensor node measures a distance of the mobile node.

The mobile node may determine whether the mobile node enters a new PAN when the beacon is received, and transmit a join request message to a sensor node directly associated by the mobile node when the mobile node enters the new PAN.

The associated sensor node may measure the distance based on an RSSI (Received Signal Strength Indication).

The mobile node may include a speed sensor and changes the MST according to a movement speed measured by the speed sensor.

The mobile node may switch to a lost connection state when the mobile does not receive the beacon within a predetermined time after requesting the ID of the PAN.

The associated sensor node may measure the distance to the mobile node based on an RSSI (Received Signal Strength Indication).

The associated sensor node may include an antenna array in order to measure the moving direction of the mobile node.

BRIEF DESCRIPTION OF THE DRAWINGS

FIG. 5 is an algorithm illustrating the mobile node's handoff procedure in the LoWMob system.

FIG. 11 is a diagram illustrating a dispatch value according to a kind of a message.

DETAILED DESCRIPTION

Figure 1:
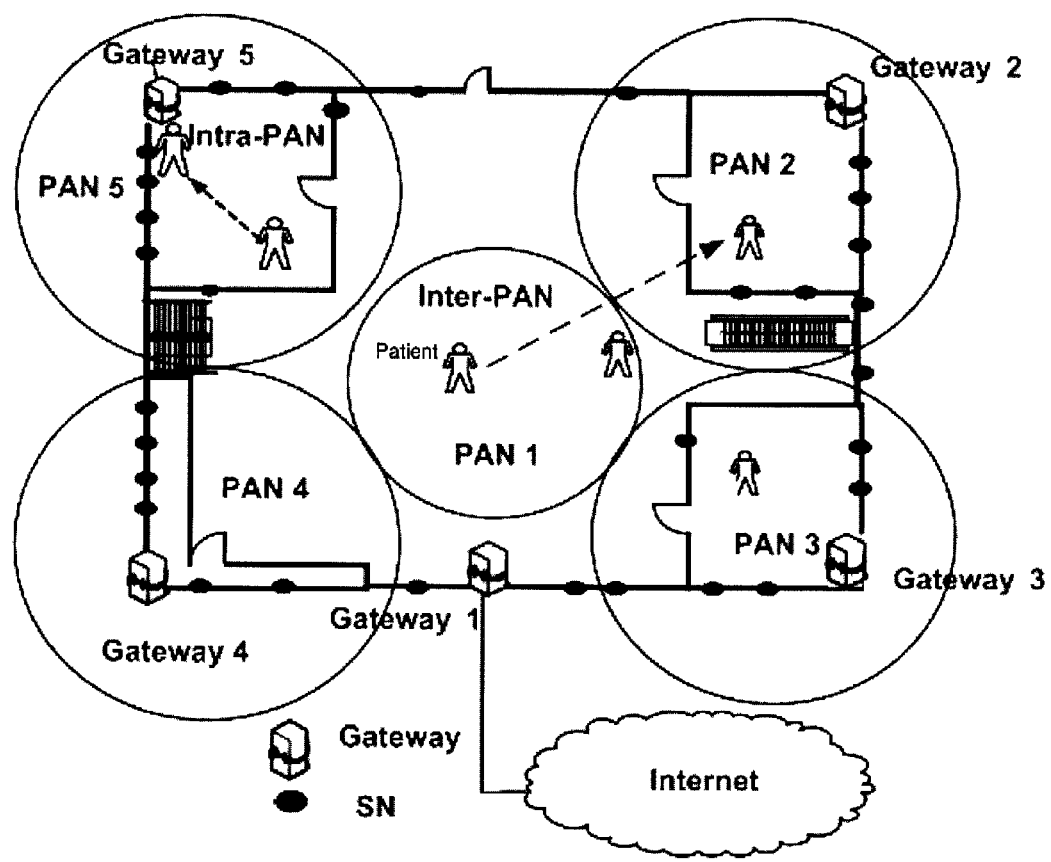
FIG. 1 is a diagram illustrating a possible mobility scenario in a 6LoWPAN (IPv6 Low Power Personal Area Network).

The technology is described more fully hereinafter with reference to the accompanying drawings, in which example embodiments of the technology are illustrated. The technology may, however, be embodied in many different forms and should not be construed as limited to the example embodiments set forth herein. Rather, these example embodiments are provided to fully enable those of ordinary skill in the art to embody and practice the technology. The technology is described in the article, "*LoWMob: Intra-PAN Mobility Support Schemes for 6LoWPAN*," Gargi Bag et al., *Sensors* 2009, 9, published on Jul. 23, 2009, which is incorporated by reference in its entirety.

Terms used herein are to be understood as described below.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element.

The term "and/or" includes any and all combinations of one or more of the associated listed items. For example, "a first item, a second item and/or a third item" denotes at least one of the first item, the second item and the third item, that is, all the combinations of the first, second and third items including the first item, the second item and the third item each.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements, e.g., "between" versus "directly between" and "adjacent" versus "directly adjacent", should be interpreted in a like fashion.

As used herein, the singular forms "a", "an" and "the" are intended to include the plural forms as well, unless the context clearly indicates otherwise. It will be further understood that the teems "comprises", "comprising", "includes" and/or "including" when used herein, specify the presence of stated features, integers, steps, operations, elements and/or components, but do not preclude the presence or addition of one or more other features, integers, steps, operations, elements, components and/or groups thereof.

Respective steps described herein may be performed in a different order than that which is explicitly described. In other words, the respective steps may be performed in the same order as described, simultaneously, or in a reverse order.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

FIG. 1 is a diagram illustrating a possible mobility scenario in a 6LoWPAN (IPv6 Low Power Personal Area Network).

FIG. 1 assumes a hospital building where each room hosts a PAN. The PAN is comprised of a sensor node SN and a gateway GW that connects the PAN to the outer world.

A patient can have a sensor node SN attached, which gathers his/her vital heath parameters like temperature and pulse rate etc. The sensor node SN then communicates these parameters to the GW, by transmitting the information to its nearest sensor node. The sensor node SN then forwards the information to the GW via other sensor node in the PAN. The following lists three possible categories of the mobility types in this scenario:

1. Intra-PAN Mobility

When a mobile node MN moves within the PAN, Intra-PAN mobility occurs. In FIG. 1, this kind of mobility occurs when a patient moves within a room. Herein, the mobile node MN means a movable sensor node among the sensor node SN.

2. Inter-PAN Mobility

This kind of mobility occurs when the mobile node MN moves from one PAN to another PAN. For example, in FIG. 1, a patient moves from one room to the other, where each room hosts one PAN.

3. WPAN Mobility

This kind of mobility occurs when the whole PAN changes its point of attachment. For example, in FIG. 1, a patient moves outside the hospital or moves to another floor.

Hereinafter, for convenience's sake, the Intra-PAN mobility will be mainly described. For this, the LoWMob (LoWPAN Mobility) system assumes the following mobility requirements.

(1) The LoWMob system provides fast handoff detection.

(2) The mobile node MN is addressable by any correspondent node CN, irrespective of its whereabouts. Herein, the correspondent node CN may correspond to a sensor node in the PAN or a gateway (or router).

(3) The signaling is minimized by considering the resource constraint characteristic of the LoWPAN devices. Herein, the LoWPAN devices may include a sensor node SN.

(4) Reduced Function Devices (RFDs) are kept out of the mobility-related signaling.

The basic assumptions of the LoWPAN system will be described.

(1) The PAN comprises at least one sensor node and a PAN coordinator. The at least one sensor node may include a Full Functional Device (FFD) and a Reduce Function Device (RFD), and the PAN coordinator may include the GW. Multiple GWs may be considered to improve the reliability and scalability. However, for convenience's sake, the PAN is assumed to have one gateway.

(2) The node at the periphery of the PAN is defined as a border node (BN). The border node BN is mostly in quasi-sleep state. In quasi-sleep state, the node's sensor is turned on, whereas its transceiver is turned off.

(3) A mobile node MN is an FFD or RFD which moves within the PAN. The mobile node MN is assumed to transmit or receive data packets periodically, i.e., if the mobile node MN does not transmit or receive data packet within MST (Maximum Sleep Time), the mobile node MN is assumed to be dead.

(4) The sensor node SN spends most of its time in the sleep state.

(5) The mobile node MN is an active device which moves within the PAN and the mobile node MN is an FFD or an RFD.

(6) The sensor node SN is densely deployed to an extent that its transmission ranges overlaps.

(7) Each 6loWPAN device has the same transmission signal strength and receiver sensitivity.

(8) Each sensor node SN measures the distance between itself and the mobile node MN based on the Received Signal Strength Indication (RSSI) [18].

(9) Each sensor node SN is equipped with a radio-triggered hardware component that activates sensors from/to the sleep state, by sending a special wake up radio signal [19].

(10) 6LoWPAN networks provide two types of addresses, IEEE EUI 64-bits extended address, and 16-bits short addresses. The sensor node SN is assigned with IPv6 and 16 bits short address [20].

(11) The mobile node MN is assigned with a 16 bits short address, which is unique within the PAN, and remains fixed irrespective of its location within the PAN. The IP address of the mobile node MN also remains fixed irrespective of its mobility within the PAN.

(12) The interoperability between IPv6 domain and the IEEE802.15.4 device is handled by the adaptation layer [20].

(13) Each sensor node SN is equipped with an antenna array in order to obtain the Angle of Arrival (AoA) measurements.

(14) Any of the MAC protocols, synchronous or asynchronous, may be used to ensure the reliability and routing of packets in duty cycle WSN (Wireless Sensor Network).

The LoWMob system will be described.

The LoWMob system provides an interface for multi-hop communication between the gateway GW and the mobile node MN. Thus, the LoWMob system enables the mobile node MN's to utilize short range IEEE802.15.4 links to send its data packets to the gateway GW, even though it is far away from the GW (i.e., the mobile node MN does not directly reaches the gateway GW). Also, the LoWMob system takes into consideration that the sensor node SN corresponds to a resource constrained device and periodically switches off to sleep state in order to conserve energy.

Like PMIPv6 (Proxy Mobile IPv6), the LoWMob system is a network based mobility scheme where the sensor node SN and the gateway GW are responsible for providing mobility support to the mobile node MN. However, in the PMIPv6 the mobility-related features are provided at the network layer. In other words, mobility-related signaling packets are carried by IP traffic [6]. The LoWMob system provides the mobility support in an adaptation layer of 6LoWPAN.

The LoWMob mobility support scheme may be divided into two parts. The first part deals with the case when a new mobile node MN enters the PAN for the first time. The second part deals with the handoff support for the mobile node MN when the mobile node MN moves within the PAN. The aim of the handoff support is to prevent packet losses. For convenience's sake, the LoWMob system a single mobile node MN's communication scenario with the GW, or with the static correspondent node CN—that may be within or outside the PAN. Because the LoWMob system introduces concepts and techniques related to the mobility in 6LoWPAN.

<New MN Joining the PAN>

Figure 2:
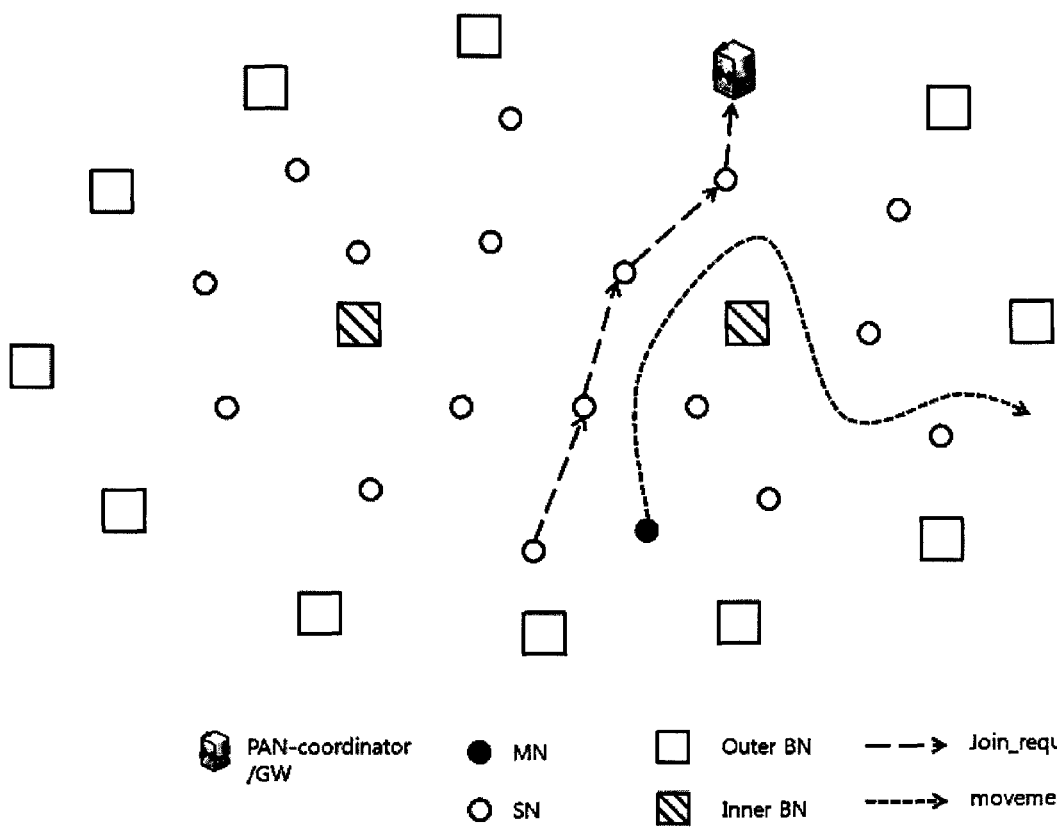
FIG. 2 is a diagram illustrating a PAN with multiple sensor nodes SNs, a single GW (or PAN coordinator) and a mobile node MN which enters the PAN for the first time.

FIG. 2 is a diagram illustrating a PAN with multiple sensor nodes SNs, a single GW (or PAN coordinator) and a mobile node MN which enters the PAN for the first time.

When the outer border node BN detects a movement at a peripheral region of a PAN, the outer border node BN switches from quasi-sleep state to active state. When the inner border node BN detects a movement at the peripheral region of the PAN, the inner border node BN switches from quasi-sleep state to active state. For example, when the mobile node approaches to inner region from outer region, the outer border node or the inner border node may detect a movement and switch from quasi-sleep state to active state. In active state, the border node frequently transmits a beacon. The inner border node may transmit a beacon more frequently than the outer boarder node. The beacon contains the information about the sensor node SN's short address and PAN ID.

Once the mobile node MN receives the beacon, the mobile node MN checks the PAN ID and determines whether the mobile node MN has moved to a new PAN or not. When a data transmission is not occurred until MST, the mobile node MN transmits a request message for PAN ID to the inner border node or the outer border node. In one embodiment, when the mobile node does not receive a beacon until a predetermined period after transmitting the request message for PAN ID, the mobile node switches to lost connection state.

If the mobile node MN is in different PAN, the mobile node MN sends a join_request message to the sensor node SN from which the mobile node MN receives the beacon of highest signal strength. The join_request message indicates to the sensor node SN that the mobile node MN is new to the PAN and wants to associate with the PAN. In one embodiment, the join_request message may contain information regarding the mobile node MN's Home address and its EUI 64 bits address.

A Outer Border Node Arranged Ne

The mobile node MN then sends a CN_address message that contains the IPv6 addresses of the correspondent node CN with which the mobile node MN usually communicates.

The sensor node SN then forwards the messages (e.g., join_request message and CN_address message) to the gateway GW.

When the join_request message reaches the gateway GW, the gateway GW creates a binding entry for the mobile node MN and, assigns mobile node MN with a unique 16 bits ID. Also, the gateway GW maps the IPv6 address of its correspondent node CN to a unique 16 bits address. Herein, for convenience's sake, a binding is assumed to be equivalent to that of a MIPv6 (Mobile IPv6) mechanism. This is done in order to save the number of bits used in the IP addressing, which might waste useful energy and bandwidth of the sensor node SN when routing the data and mobility-related packets of the mobile node MN. Then the gateway GW sends a join_confirm message to the sensor node SN that forwards it to the mobile node MN. The join_confirm message contains the mobile node MN's ID and the short address of its correspondent node CN.

If, in future, the mobile node MN wants to communicate with a correspondent node CN for the first time, then the mobile node MN will request the gateway GW to provide a 16 bits address by sending correspondent node CN's alias name. Thus, the gateway GW may run an Address Resolution Protocol (ARP) and provides a 16-bits address against the correspondent node CN's IP address or its alias name.

Similarly, when a packet for the mobile node MN may arrive from the correspondent node CN that is located outside the PAN, for which the gateway GW does not have a pre-existing binding. In this case, the gateway GW will first create a binding and sends this binding to the mobile node MN before sending the data packet.

The mobile node may change MST according to a movement speed. The mobile node MN may send data packet or messages to the sensor node based on the changed MST. The mobile node MN may also receive data packet or the messages from the sensor node based on the changed MST. In one embodiment, the mobile sensor may include a speed sensor and change the MST according to the movement speed measured by the speed sensor. For example, when the mobile node moves fast in the PAN, the mobile node may increase data transmission rate by setting the MST with a small value. When the mobile node moves slow in the PAN, the mobile node may decrease data transmission rate by setting the MST with a large value for efficient energy use.

<Handoff Support>

Figure 3:
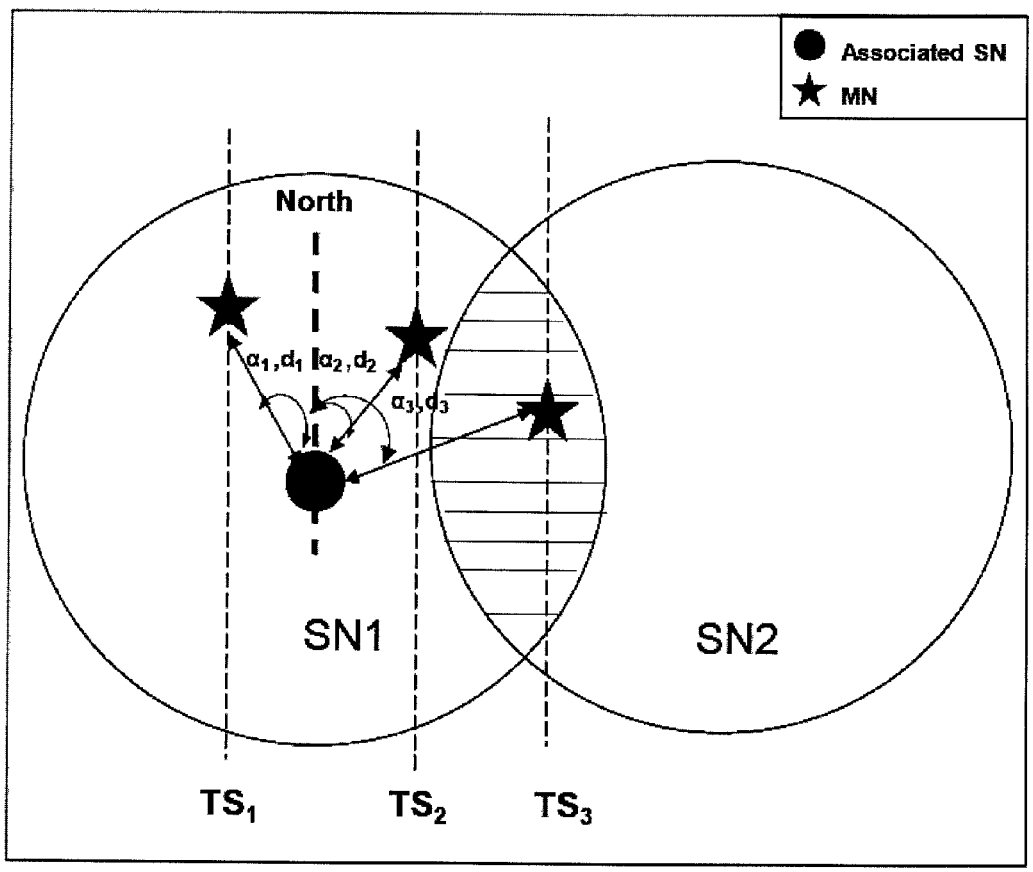
FIG. 3 is a diagram illustrating a next node activation procedure using an AoA (Angle of Arrival).
Figure 4:
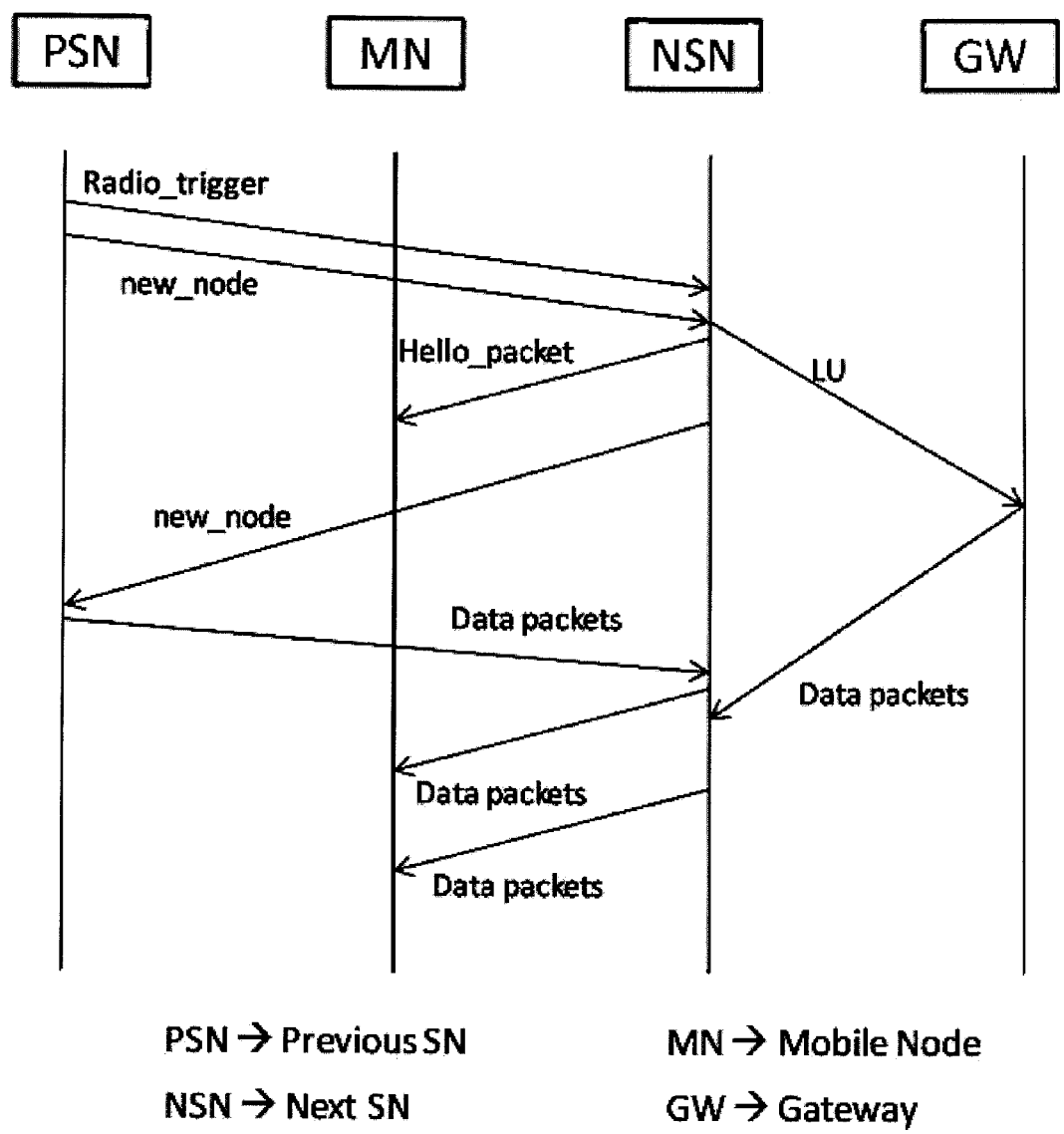
FIG. 4 is a flowchart for illustrating a procedure when a handoff is performed in the LoWMob system.

FIG. 3 is a diagram illustrating a next node activation procedure using an AoA (Angle of Arrival). FIG. 4 is a flowchart for illustrating a procedure when a handoff is performed in the LoWMob system. FIG. 5 is an algorithm illustrating the mobile node's handoff procedure in the LoWMob system.

In FIG. 3, the LoWMob system considers the sleep state of the sensor node SN for supporting a handoff for the mobile node MN. Once the associated sensor node SN observes that its link quality with the mobile node MN has degraded beyond a certain threshold value, the associated sensor node SN then concludes that the mobile node MN is moving. Hence the associated sensor node SN needs to activate the next appropriate sensor node SN for the handoff process. In order to activate the next appropriate sensor node SN, the associated sensor node SN obtains a direction where the mobile node MN is moving. The direction may be obtained through localization procedure, where a series of mobile node MN's locations depict its course of movement, i.e., tracking. There are various methods to obtain MN location like, trilateration/triangulation method, AoA (Angle of Arrival), and ToA/TDoA (Time {Difference} of Arrival) method, signal strength indicator etc. In order to determine the direction of movement, the LoWMob system assumes to adopt the AoA method [21].

The AoA is defined as the angle between a propagation direction of an incident wave and a reference direction, which is known as orientation. Orientation, defined as a fixed direction against which the AoAs are measured, may be represented in degrees in a clockwise direction from the North. When the orientation is 0 degree or pointing to the North, the AoA is absolute otherwise it is relative.

As shown in FIG. 3, 'the star' shows the mobile node MN's position at time-stamps TS1, TS2, and TS3 respectively. The associated sensor node SN measures the AoA from the signal that it receives from the mobile node MN. Moreover, the associated sensor node SN also estimates the distance between the mobile node MN and itself by using received signal strength of the packets.

FIG. 3 assumes that ($\alpha 1$, d1), ($\alpha 2$, d2), ($\alpha 3$, d3) correspond to angles (in degree) and distances between the sensor node SN1 and the mobile node MN, at time-stamps TS1, TS2 and TS3 respectively. Based on the angle and distance information, the sensor node SN may obtain the mobile node MN's location coordinate. At the time-stamp TS3, the sensor node SN1 awakes the next sensor node SN2 for the handoff. Also, the sensor node SN1 sends a new_node message to the sensor node SN2 that contains the mobile node MN's ID.

When the next sensor node SN receives the new_node message, it transmits a hello_packet at some intervals. Also, the next sensor node SN sends a location_update message to the gateway GW. When the next sensor node SN detects the mobile node MN, the next sensor node SN again sends a new_node message to the previous sensor node SN. The new_node message may be used to create a tunnel between the next sensor node SN and the previous sensor node SN, so that as soon as the previous sensor node SN receives the new_node message, the previous sensor node SN starts forwarding the mobile node MN's packets to the new location. The tunnel's outer header contains the next sensor node SN as a destination and previous sensor node SN as a source. When the mobile node MN's packets stop arriving at the previous sensor node SN, the previous sensor node SN switches to the sleep mode after a short interval of time.

If the next sensor node SN does not detect the mobile node MN within a certain amount of time, the next sensor node SN will consider that the mobile node MN is lost. So the next sensor node SN will request, by sending a radio triggered broadcast, to all of its neighboring sensor nodes SNs to suspend their duty cycle and keep awake until the mobile node MN is found.

Figure 6:
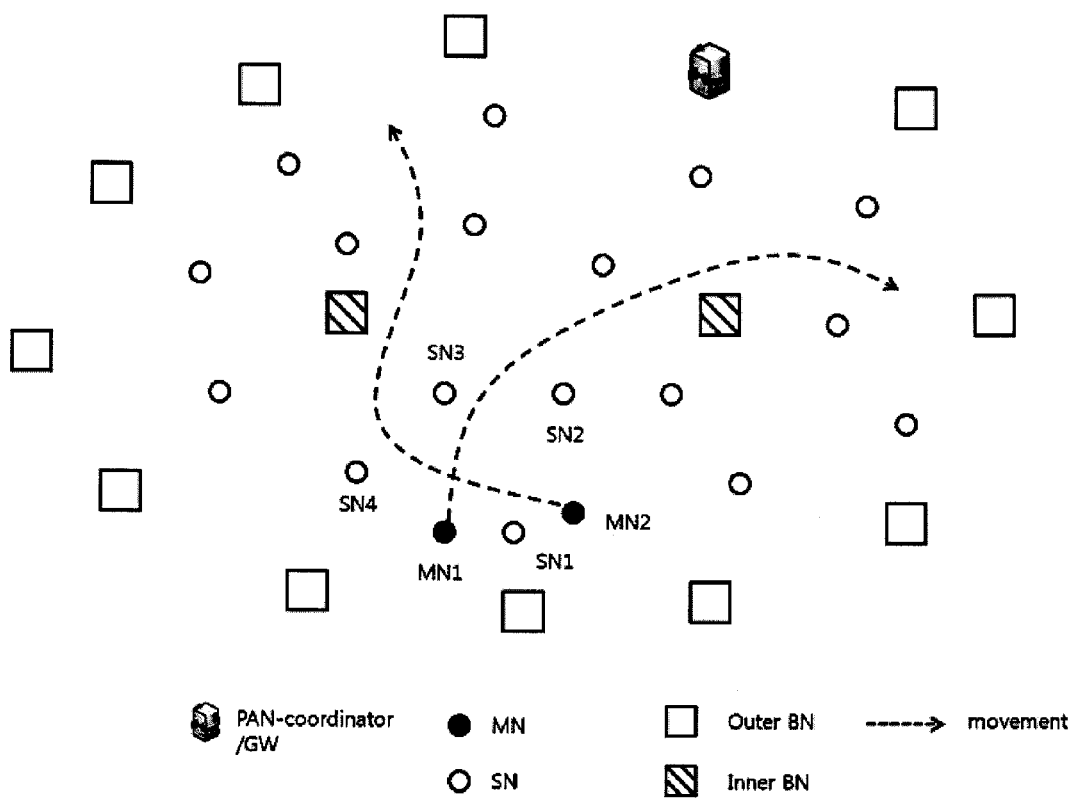
FIG. 6 is a diagram illustrating an operation of the sensor node.

FIG. 6 is a diagram illustrating an operation of the sensor node.

The sensor node may broadcast neighbor node information message base on a direction of movement while the mobile node moves in a region managed by the sensor node. The neighbor node information message includes ID of the mobile node and ID of at least one sensor node located at direction of movement. The sensor node may know the direction of movement of the mobile node based on a distance and/or AoA of the mobile node. The sensor node received a message from neighbor may know an approach of the mobile node in advance.

For example, when a first mobile node MN1 moves in a region managed by a first sensor node SN1, the first sensor node SN1 may broadcast the neighbor node information message. When the first mobile node MN1 moves toward a second sensor node SN2 and a third sensor node SN3 in a region managed by the first sensor node SN1, the first sensor node SN1 may broadcast the neighbor node information message including IDs of the mobile node, the second sensor node and the third sensor node. In one embodiment, the neighbor node information message may include the ID of the sensor node SN1 broadcasting the neighbor node information message.

When a plurality of mobile nodes MN move in a region managed by a sensor node SN, the sensor node SN broadcasts the neighbor node information message regarding each of the mobile nodes. For example, as illustrated in FIG. 6, when the first mobile node MN1 moves toward a second sensor node SN2 and a third sensor node SN3, the second mobile node MN2 moves toward a third sensor node SN3 and a fourth sensor node SN4, in a region managed by the first sensor node SN1, the first sensor node SN1 may broadcast a first neighbor node information message including IDs of the first mobile node, the second sensor node and the third sensor node and a second neighbor node information message including IDs of the second mobile node, the third sensor node and the fourth sensor node. The first sensor node may broadcast the first neighbor node information message and the second neighbor node information message concurrently or independently.

In one embodiment, the sensor node may change time interval of broadcasting the neighbor node information message based on movement speed of the mobile node. For example, when difference between a current distance and/or AoA of the mobile node and a previous distance and/or AoA of the mobile node is larger than predetermined value, the sensor node may change time interval of broadcasting the neighbor node information message.

In one embodiment, when a plurality of mobile nodes MN move in a region managed by a sensor node SN, the sensor node SN broadcasts the neighbor node information message based on movement speed of each mobile node. In one embodiment, when differences of distance and/or AoA of the plurality of the mobile nodes are larger than a predetermined value, the sensor node may broadcast the neighbor node information messages regarding each of the mobile nodes independently. In other embodiment, when differences of distance and/or AoA of the plurality of the mobile nodes are smaller than the predetermined value, the sensor node may broadcast the neighbor node information messages regarding each of the mobile nodes concurrently.

For example, as illustrated in FIG. 6, when the first mobile node MN1 moves toward a second sensor node SN2 and a third sensor node SN3, the second mobile node MN2 moves toward a third sensor node SN3 and a fourth sensor node SN4, in a region <Proposed Message Formats>

A mobility-related signaling message formats needed to support the mobile node MN within the PAN will be described. The message format makes use of 6LoWPAN's adaptation layer's reserved dispatch values, in order to differentiate between different kinds of mobility messages exchanged between the sensor nodes SNs and the gateway GW [20]. Every adaptation layer packet begins with a dispatch value that identifies the type of header to be followed next. The dispatch value, an 8 bits value, indicates what kind of packet is it. For example, a dispatch value of {01 000001} indicates that the following header is an uncompressed IPv6 header. The pattern {01 000010} represents that the following header is fully compressed from 2 bytes to 40 bytes. When there are more than one LoWPAN headers, they may appear in the following order: Mesh header, Fragmentation header, and Header Compression header. Also, the dispatch headers may appear before each header [20]. Moreover, 16 bits addressing scheme is used in order to route the data packets to and from the mobile node MN. The following message format may utilize the adaptation layer reserved dispatch values and 16 bits addressing scheme.

(1) Location Update Message Format

Figure 7:
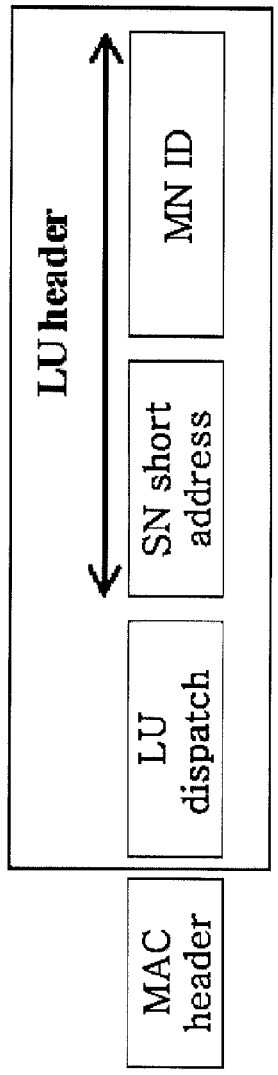
FIG. 7 is a diagram illustrating a format of a location_update message that a sensor node SN sends to the gateway GW when the mobile node MN associates with the sensor node SN.

FIG. 7 is a diagram illustrating a format of a location_update message that a sensor node SN sends to the gateway GW when the mobile node MN associates with the sensor node SN.

The sensor node SN sends a location_update message with a unique dispatch. The dispatch indicates that the message is the location_update message that is forwarded to the gateway GW. The location_update message also contains the 16 bits short address of a source sensor node SN. The intermediate nodes relay the location_update message to the gateway GW by checking the dispatch value.

When the gateway GW receives the message, the gateway GW identifies the message as a location_update message and updates an entry of the mobile node MN by replacing the previous sensor node SN' short address with the next sensor node SN's address. The entry for the mobile node MN remains in the binding table of the gateway GW, as long as the gateway GW keeps receiving the location_update message on behalf of the mobile node MN. When the gateway GW stops receiving the location_update messages of the mobile node MN, the gateway GW deletes its entry in the binding table after the timeout of which the exact value is implementation specific. For example, the timeout may correspond to a few minutes.

(2) Message Format of a Data Packet Sent from a MN to the CNs

Figure 8:
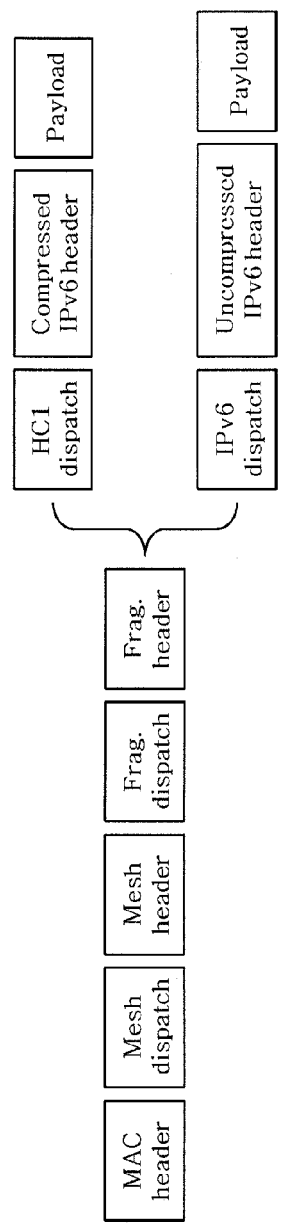
FIG. 8 is a diagram illustrating a format of a message from a mobile node MN to a correspondent node CN.

FIG. 8 is a diagram illustrating a format of a message from a mobile node MN to a correspondent node CN.

The fragmentation header is optional and is used when the packet size is large enough to be fit into the Maximum Transmission Unit (MTU) for IPv6 packets over IEEE 802.15.4. HC1 is the dispatch header that indicates a compressed IPv6 header. An uncompressed IPv6 header is represented by IPv6 dispatch.

When the sensor node SN receives the message, the sensor node SN first checks whether the sensor node SN has a routing entry for the destination or not. If the destination correspondent node CN is located within the PAN, the sensor node SN forwards the packet to the node closer to the correspondent node CN. If the sensor node SN is unable to locate the destination within the PAN, then the sensor node SN forwards the message to the gateway GW. In this case, the sensor node SN takes off the mesh header and inserts MN-GW dispatch and the MN-GW header. The MN-GW dispatch indicates to the forwarding nodes that the source of the message is a mobile node MN, and the packet needs to be forwarded to the GW. A header of the message includes source mobile node MN's address and destination correspondent node CN's address. Thus using the dispatch value eliminates the need of having tunnel between the sensor node SN and the gateway GW.

Figure 9:
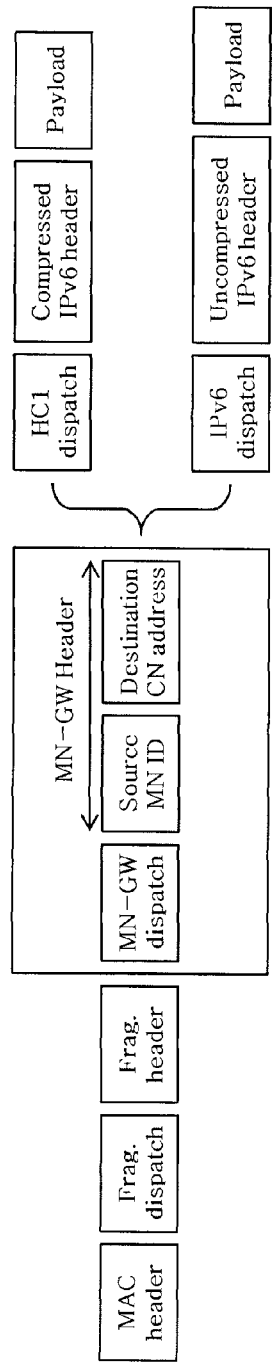
FIG. 9 is a diagram illustrating a format of a mobile node MN's message that a sensor node SN forwards to a gateway GW.

FIG. 9 is a diagram illustrating a format of a mobile node MN's message that a sensor node SN forwards to a gateway GW.

When the gateway GW receives the message, the gateway GW takes off the MN-GW header, assembles the fragments, and decompresses the IPv6 header, if needed before forwarding the message to the correspondent node CN.

Figure 10:
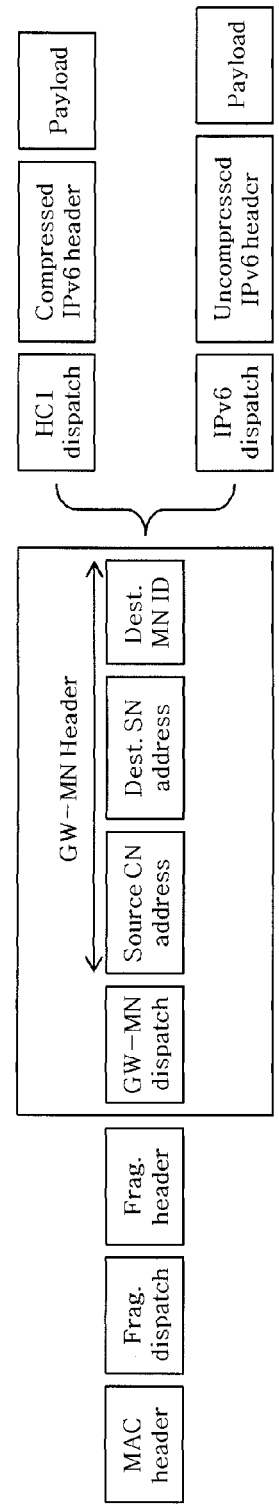
FIG. 10 is a diagram illustrating a format of a message sent from a correspondent node CN to a mobile node MN.

(3) Message Format of a Data Packet Sent from a Correspondent Node CN to the Mobile Node MN FIG. 10 is a diagram illustrating a format of a message sent from a correspondent node CN to a mobile node MN.

When a correspondent node CN, which is located either outside or inside the PAN, wants to send a message to a mobile node MN, the correspondent node CN first sends the message to the gateway GW. This is because the gateway GW has a binding cache which stores the mapping of mobile node MN's ID with its current location in terms of sensor node SN's short address. The gateway GW then fragments and compresses the received message, if needed. Thereafter, the gateway GW attaches GW-MN dispatch and the message's header. The dispatch indicates that this message is for the mobile node MN and sent by the gateway GW. The message's header contains 16 short bits address of the sensor node SN, with which the mobile node MN is currently associated, the source correspondent node CN's 16 bits address, and the destination mobile node MN's 16 bits ID.

The message, sent by the gateway GW, is then relayed over a number of hops as the message reaches a destination sensor node SN. By looking at the dispatch value, the intermediate relaying nodes know that the message is sent from the gateway GW. When the destination sensor node SN receives the message, the destination sensor node SN takes off GW-MN dispatch and the destination sensor node SN's address from the message and forwards the message to the mobile node MN. Thus, the mobility support scheme identifies a mobility-related message with the use of specific dispatch values. FIG. 11 is a diagram illustrating a dispatch value according to a kind of a message.

Hereinafter, a Distributed LoWMob (DLoWMob) system will be described.

The DLoWMob system enhances the performance of the LoWMob system by introducing the concept of a mobile service point (MSP). The DLoWMob system reduces the signaling traffic at the gateway GW and enables the route optimization in 6LoWPAN. While the LoWMob system enables 6LoWPAN mobility without having mobile node MNs involved in most of the mobility-related signaling, the LoWMob system causes the gateway GWs to be involved in all of the mobility-related signaling and data packet handling. That is, whenever a mobile node MN associates with a new sensor node SN, the sensor node SN sends a location_update messages to the gateway GW that might negatively affect the lifetime of the sensor node SN and ultimately the whole PAN. Moreover, the mobile node MN's data packets are routed through the gateway GW; since it has the binding information of the mobile node MN's ID with its current associated sensor node SN, thereby increasing the traffic concentration at the gateway GW.

Figure 12:
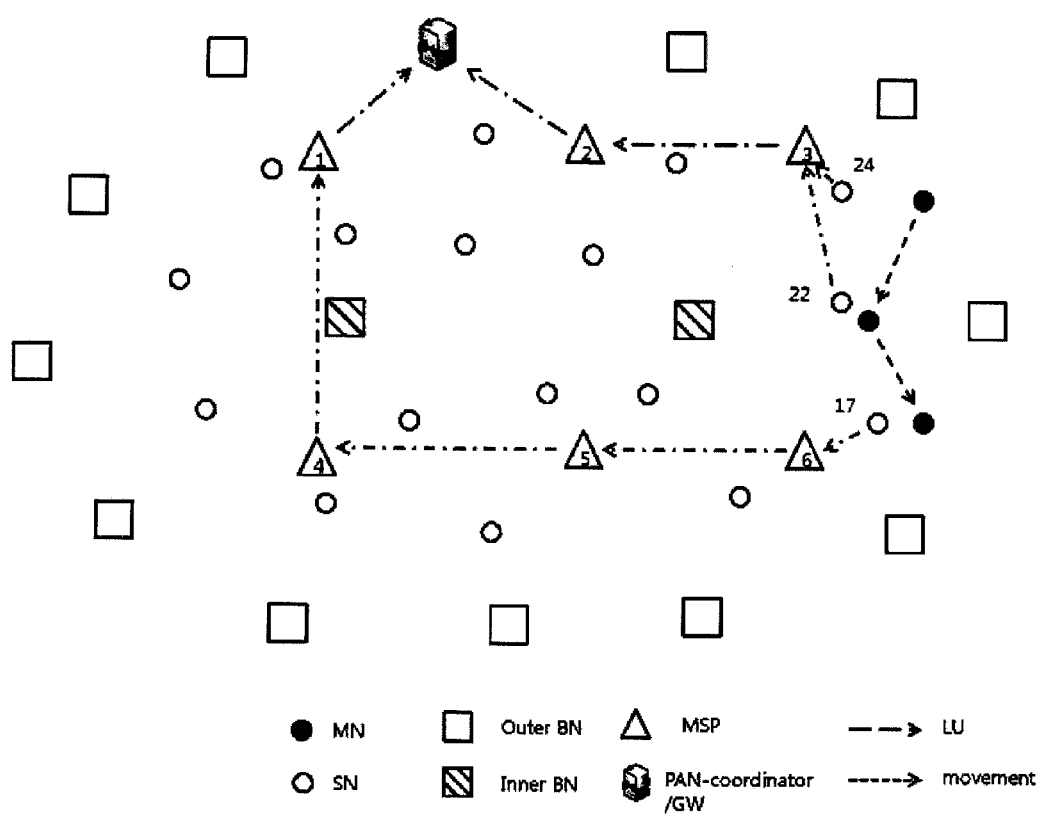
FIG. 12 is a diagram illustrating a DLoWMob system.

FIG. 12 is a diagram illustrating a DLoWMob system.

As illustrated in FIG. 12, in the DLoWMob system, the PAN is assumed to be partitioned into multiple regions. Each region has one MSP and its associated sensor node SN which is managed by the MSP. Hence there exists a hierarchy in the PAN. The gateway GW manages the MSP, while each MSP manages its associated sensor node SN in its region.

The main functions of the MSP are two-fold.

Firstly, the MSP limits the number of the location_update message to the gateway GW by managing the binding information between mobile node MNs and the sensor node SN in its region locally. That is, the MSP reports the location_update message to the gateway GW when the mobile node MN enters in its own region. While the mobile node MN moves in its region, from the sensor node SN to another SN in the region, no location_update message is required to be sent to the gateway GW. Consequently, the MSP might reduce significant network bandwidth and the energy consumption.

Secondly, the MSP enables the data packets between the mobile node MN and its correspondent node CN in the PAN to be routed between its corresponding MSP. That is, it removes the need of having every data packets passing through the gateway GW, thus making route optimization possible.

<Handoff Process in the DLoWMob System>

In the DLoWMob system, a Handoff process is basically the same as the LoWMob system, except for the MSP's participation. When the mobile MN moves closer towards the next sensor node SN, the previous sensor node SN notifies the next sensor node SN about the handoff by sending a new_node message. When receiving the new_node message, the next sensor node SN sends the location_update message to the MSP. The MSP checks whether the MSP has an entry for the mobile node MN or not. If the mobile node MN's previous sensor node SN and next sensor node SN are registered with the MSP, i.e., the both sensor node SNs are in the same region of the MSP, the MSP updates its binding table by modifying the entry of the previous sensor node SN. In this case, the MSP does not forward the location_updatge message to the gateway GW. Otherwise, the MSP sends the location_update message to the gateway GW, so that the gateway GW may update its binding table for the mobile node MN. The binding information in the MSP for the mobile node MN remains as long as there is an active communication between the mobile node MN and its correspondent node CN. If the mobile node MN does not send or receive data packets within the MSP, the MSP may delete the mobile node MN's entry because the mobile node MN is assumed to be dead.

In FIG. 11, the mobile node MN is moving from SN24 to SN17 via SN22 within the PAN. When the mobile node MN enters the coverage area of the MSP for the first time, then the MSP sends the location_update message to the gateway GW with the help of other MSP. For example, when the mobile node MN is associated with sensor node SN24 (i.e., it enters into the region of MSP3), MSP3 sends a location_update message to the gateway GW. When the mobile node MN is associated with the sensor node SN22, MSP3 does not send the location_update message to the gateway GW because the movement is within intra-region, and the binding information is managed by the MSP itself.

<Route Optimization for Intra-PAN Communication in the DLoWMob System>

A route optimization scheme for an Intra-PAN communication in order to reduce the traffic concentration at the GW will be described. This could extend the lifetime of the nodes near the gateway GW, thereby extending the network lifetime. Also, a handoff mechanism for route optimization scheme will be described. The mechanism could support the handoff for the communication even when the source and destination are mobile.

(1) Routing of MN's Packet in a Route Optimized Environment

The MSP in the DLoWMob system enables the route optimization between multiple corresponding MNs by creating and storing the routing entries, specific to the mobile nodes MNs in their routing table. Based on the routing table entries, the proposed mobility header facilitates routing between a source and the destination MSP.

The routing of the mobile node MN's packets with the help of the MSP has two stages. In the first stage, a source MSP tries to locate a destination mobile node MN's MSP on behalf of a source mobile node MN. In this process, the source and destination mobile node MN's specific routing entries are created in the MSP that fall within the path of the source and destination MSP. In the second stage, the data packets are routed based on the routing entries created in the MSP and the proposed mobility header and dispatch.

Figure 13:
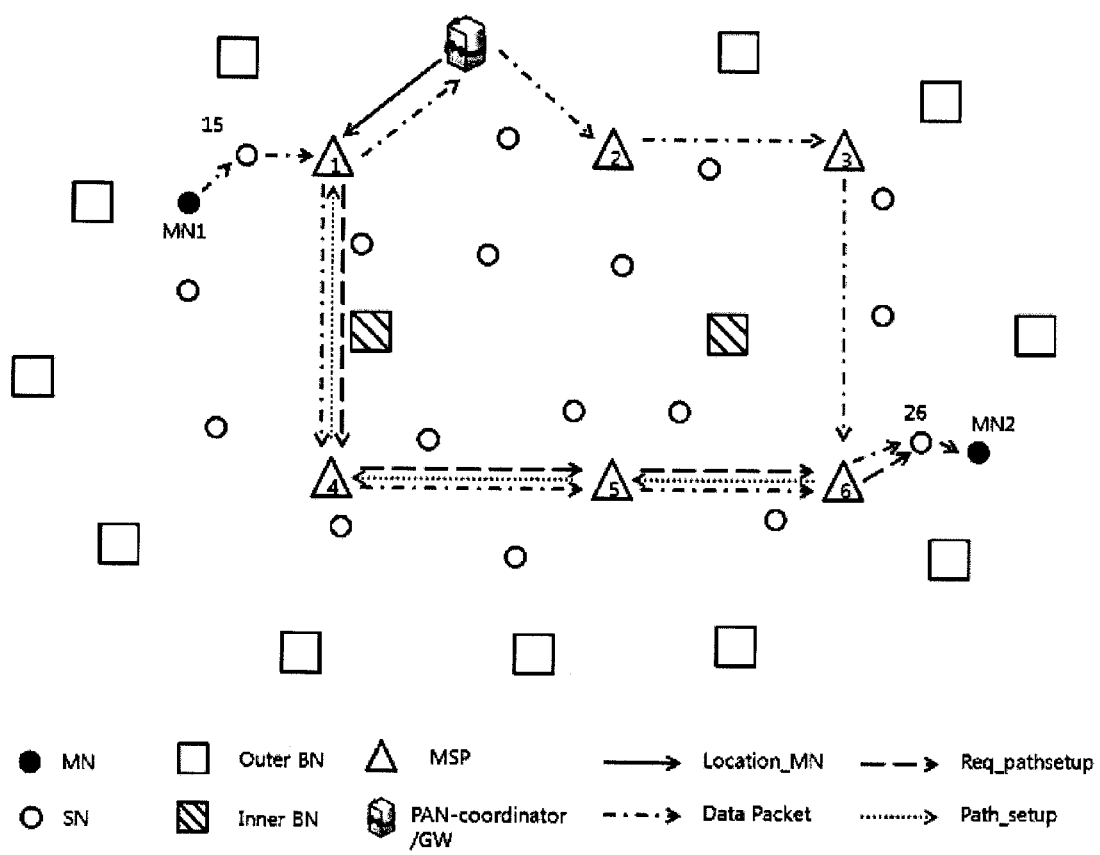
FIG. 13 is a diagram illustrating a route optimization scheme and a DLoWMob mobility scheme.

FIG. 13 is a diagram illustrating a route optimization scheme and a DLoWMob mobility scheme.

FIG. 13 shows two mobile nodes MNs, as located within the same PAN. The mobile node MN1 is associated with the sensor node SN15, whereas the mobile node MN2 is associated with the sensor node SN26. When the mobile node MN1 wants to send a data packet to the mobile node MN2 for the first time, the mobile node MN1 first sends it to the sensor node SN15. The packet format may be the same as described in FIG. 7.

When the sensor node SN15 receives a data packet from the mobile node MN1, the sensor node SN15 forwards the packet to MSP1. MSP1 checks whether it has an entry for the mobile node MN2 in its routing table or not. If the source MSP, i.e., MSP1 does not find a routing entry for the destination MN, it takes off the mesh header from the data packet and adds MN-GW dispatch and MN-GW header to the data packet. The source MSP then forwards the data packet to the GW, which in turn advances it to the destination MSP using the packet format as shown in FIG. 10. As described in FIG. 10, a destination sensor node SN address will be replaced by a destination MSP address. When the packet reaches the destination MSP, the destination MSP replaces its address with sensor node SN's address with which the mobile node MN is associated.

Also, at the same time, the gateway GW sends a location_MN message to the source MSP. The location_MN message contains the address of the destination MSP. Once the source MSP receives the location information of the MN, it sends a request_pathsetup message to the destination MSP, which contains the IDs of both MN1 and MN2. When the destination MSP, i.e., MSP6, receives request_pathsetup message, then the destination MSP forwards the message to the sensor node SN with the destination mobile node MN is associated, i.e., SN26. The destination MSP, i.e., MSP6, then sends a path_setup message back to the MSP1 that contains MN2 and MN1's ID. When forwarding the path_setup message back to MSP1, the MSP enroutes records destination and source MSP address, IDs of both MNs, and the MSP from which it has received a path_setup message. Thus each MSP would get a routing table entry in order to route the packets between the mobile nodes MNs. When MSP1 receives path_setup message, it creates a routing entry for the destination MN, i.e., MN2; and forwards path_setup message to SN15 with which MN is currently associated. Moreover, when the path_setup message reaches the source MSP, it immediately stops sending the mobile node MN's data packet to the GW. Instead, it attaches MN-MN header and dispatch to the data packets and forwards the packet to the MSP from which it received the path_setup message.

Figure 14:
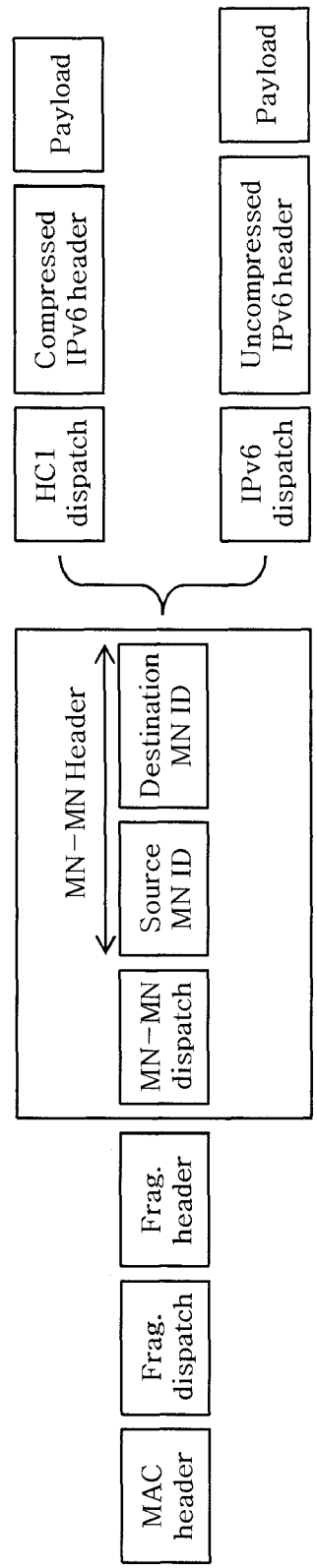
FIG. 14 is a diagram illustrating a format of a message for a data packet from a source mobile node MN to a destination mobile node MN via an MSP.

FIG. 14 is a diagram illustrating a format of a message for a data packet from a source mobile node MN to a destination mobile node MN via an MSP.

For instance, in FIG. 13, the MSP1 forwards mobile node MN1's data packet to MSP4. MSP4 confirms, by checking the MN-MN dispatch, that MSP4 is a data packet towards the mobile node MN. Thereafter, the MSP4 verifies whether it has any record in its routing table about the possible current location of the destination mobile node MN2. Since the MSP4 has already created a record from the path_setup message, the MSP4 forwards the packet to the next MSP on the route (i.e., MSP5 in FIG. 12). This process continues until the packet reaches the destination MSP (i.e., MSP6 in FIG. 12). The destination MSP then forwards the data packets to the destination SN (i.e., SN26 in FIG. 12) using the packet format of FIG. 10. However, in this case the dispatch and the header will be MSP-SN.

(2) Handoff Process in the Routing Optimization Scheme

In the route optimized scheme, when the mobile node MN moves to a different MSP while communicating with another mobile node MN, a new path is needed to be established between the destination and source MSP. This section introduces the modified version of the handoff process to enable creation of a new path between source and destination MSP.

Figure 15:
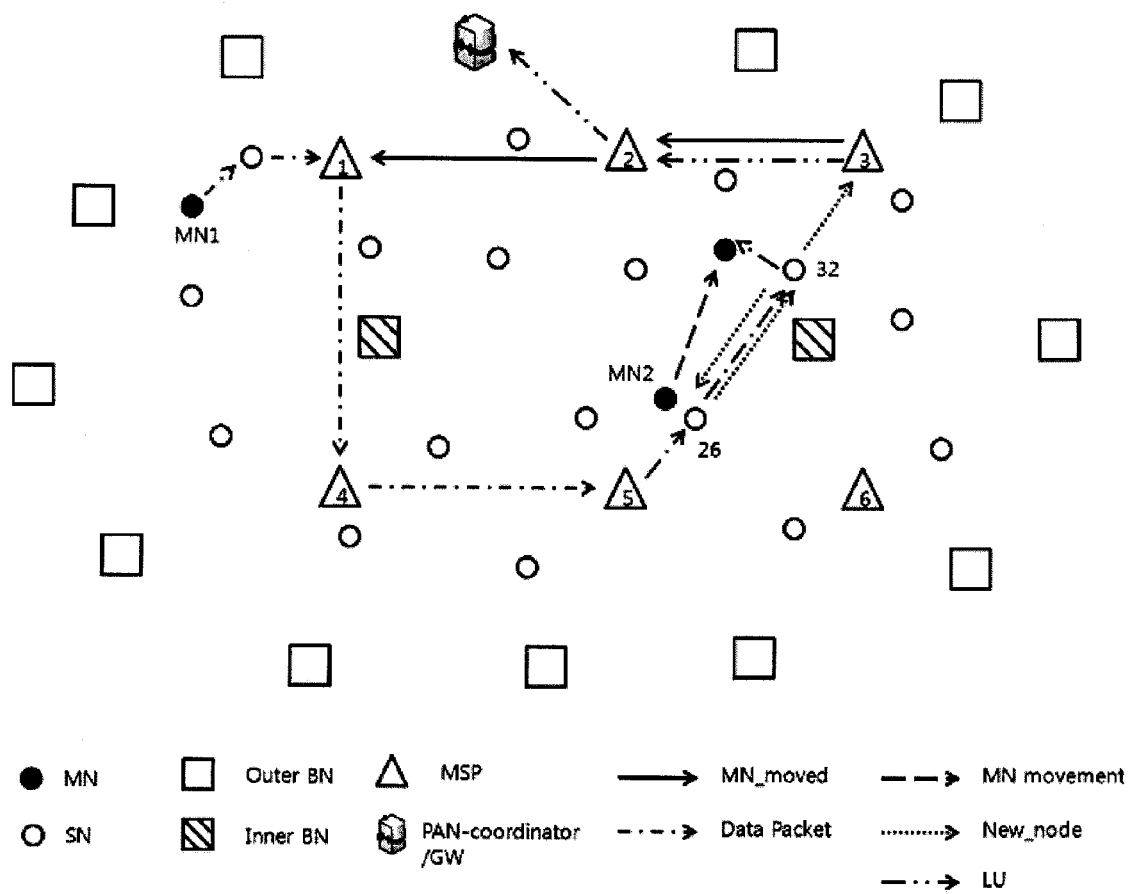
FIG. 15 is a diagram illustrating a handoff process in the DLoWMob system that employs the routing optimization scheme.

FIG. 15 is a diagram illustrating a handoff process in the DLoWMob system that employs the routing optimization scheme.

In FIG. 15, when the communication link between the mobile node MN2 and the sensor node SN26 degrades, the sensor node SN26 sends a new_node message to the next or future sensor node SN i.e., SN32. This time new_node message contains MN1's ID and its MSP's short address, i.e., MSP1's address, along with MN2'ID. Then the sensor node SN32 forwards the new_node message to its MSP, i.e., MSP3. MSP3 then sends an LU to the GW, and MN_moved message to MSP1. The MN_moved message contains the addresses of both of the MSPs, as source and destination, and the MN's addresses. The MSPs, which forward the MN_moved message to the MSP1, record the two MN's IDs and their respective MSPs. The purpose of this message is to create route specific entries on behalf of the two mobile nodes MNs. When the message reaches MSP1, it broadcast the message to its one hop neighbors (MSPs). This is done so that in case if the mobile node MN1 has also moved to a new MSP, then the new MSP is informed about the destination MN's movement. Moreover, once the MN_moved message reaches MSP1, it immediately starts forwarding the MN1's data packets, if any; to the next MSP from which it received the MN_moved message i.e., MSP2. When MSP2 checks the destination of the packet, it knows that the MN2 is associated with MSP3 and forwards the packet to the next MSP, i.e., MSP3 (which is the destination MSP as well). Meanwhile, until the MN_moved message reaches the MSP1, MSP1 keeps sending the packets to the old path. The packets are delivered to the MN2 through the tunnel created between the current SN and the previous SN.

Similarly, when the source mobile node MN, i.e., MN1, moves while sending the data packets to the mobile node MN2, its current sensor node SN will inform the next sensor node SN about its corresponding mobile node MN's MSP. Also, the current sensor node SN will notify the next sensor node SN about its own MSP so that the next MSP can forward mobile node MN's data packet to the previous MSP since it already has a path towards the destination mobile node MN. Meanwhile, the next MSP can send a MN_moved to the destination MN's MSP, in order to establish a path between itself and destination MSP. It should also be noted that the routing table entries of MSPs will expire when the source stops sending data packets to destination MN.

A LoWMob system and a DLoWMob system according to an example embodiment may prevent a packet loss due to a mobility while reducing a mobility-related signaling.

A LoWMob system and a DLoWMob system according to an example embodiment may increase a lifetime of a whole network by reducing power consumption of a sensor node.

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

REFERENCES

1. Wireless Medium Access Control and Physical Layer Specifications for Low-Rate Wireless Personal Area Networks; 802.15.4-2003, IEEE Standard, September 2006.
2. IPv6 over Low Power WPAN (Active WG). http://tools.ietf.org/wg/6lowpan.
3. Shin, M.; Camilo, T.; Silva, J.; Kaspar, D. Internet-Draft-6lowpan-mobility; Internet-Draft, 14 Nov. 2007 (work in progress).
4. Soliman, H.; Castelluccia, C.; Malki, K. E.; Bellier, L. Hierarchical MIPv6 Mobility Management, RFC 4140, August 2005.
5. Saha, D.; Mukherjee, A.; Misra, I. S.; Chakraborty, M. Mobility Support in IP: A Survey of Related Protocols. IEEE Network 2004, 18, 34-40.
6. Akyildiz, I. F.; Xie, J.; Mohanty, S. A Survey of Mobility Management in Next-Generation All-IPBased Wireless Systems. IEEE Wirel. Commun. 2004, 11, 16-28.
7. Ramjee, R.; La Porta, T.; Thuel, S.; Varadhan, K.; Wang, S. HAWAII: A Domain Based Approach for Supporting Mobility in Wide Area Wireless Area Networks. In Seventh International Conference on Network Protocols, Toronto, Canada, 1999; pp. 283-292.
8. Devarapalli, V.; Wakikawa, R.; Petrescu, A.; Thubert, P. Network Mobility (NEMO) LoWMob Support Protocol, RFC 3936, January 2005.
9. Gundavevelli, S.; Leung, K.; Devrapalli, V.; Chowdhury, K.; Patil, B. Proxy Mobile IPv6, August 2008.
10. Istepanian, R.; Jovanov, E.; Zhang, Y. Guest Editorial Introduction to the Special Section on MHealth: Beyond Seamless Mobility and Global Wireless Health-care connectivity. IEEE Trans. Inf Technol Biomed. 2004, 8, 405-414.
11. Ni, X.; Shi, W.; Ni, X.; Zheng, S. Design of Micro Mobility Support in Bluetooth Sensor Networks. In IEEE International Conference on Industrial Informatics, Singapore, 16-18 Aug. 2006; pp. 150-154.
12. Kim, J. H.; Hong, C. S.; Okamura, K. A Routing Scheme for Supporting Network Mobility of Sensor Network Based on 6LoWPAN. In Managing Next Generation Networks and Services; Springer Verlag: Berlin-Heidelberg, Germany, 2007; Vol. 4773, pp. 155-164.
13. Kempf, J. Problem Statement for Network-Based Localized Mobility Management. RFC 4830, April 2007.
14. Wang, H.; Huang, Q.; Xia, Y; Wu, Y.; Yuan, Y. G. A Network-Based Local Mobility Management Scheme for Wireless Mesh Networks. In IEEE Wireless Communications and Networking Conference, Hong Kong, 11-15 Mar. 2007; pp. 3792-3797.
15. Bag, G.; Raza, M. T.; Mukhtar, H.; Akbar, A. H.; Shams, S. M. S.; Kim, K.-H.; Yoo, S.-W.; Kim, D. H. Energy-Aware and Bandwidth-Efficient Mobility architecture for 6LoWPAN. In IEEE Military Communications Conference, San Diego, USA, 16-19 Nov. 2008; pp. 1-7.
16. Bag, G.; Shams, S. M. S.; Akbar, A. H.; Raza, H. M. M. T.; Kim, K.-H.; Yoo, S.-W. Network Assisted Mobility Support for 6LoWPAN. In 6th IEEE Consumer Communications and Networking Conference, Las Vegas, USA, 10-13 Jan. 2009; pp. 1-5.
17. Bag, G; Shams, S. M. S.; Mukhtar, H. Inter PAN Mobility Support for 6LoWPAN. In Third International Conference on Convergence and Hybrid Information Technology, Busan, Korea, 11-13 Nov. 2008; pp. 787-792.
18. Zhang, L.; Cheng, Q.; Wang, Y.; Zeadally, S. A Novel Distributed Sensor Positioning System Using the Dual of Target Tracking. IEEE Trans. Comput. 2008, 57, 246-260.
19. Gu, L.; Stankovic, J. A. Radio-Triggered Wake-Up for Wireless Sensor Networks. In 10th IEEE Real-Time and Embedded Technology and Applications Symposium, Miami, USA, March 2005; pp. 157-182.
20. Kushalnagar, N.; Montenegro, G.; Hui, J.; Culler, D. 6LoWPAN: Transmission of IPv6 Packets over IEEE 802.15.4 Networks. RFC 4944, September 2007.
21. Patwari, N.; Ash, J.; Kyperountas, S.; Hero, A.; Moses, R.; Correal, N. Locating the nodes: Cooperative Localization in Wireless Sensor Networks. IEEE Signal Process Mag. 2005, 22, 54-69.

What is claimed is:

1. A system for providing a Low power Wireless Personal Area Network, the system comprising:
   a mobile node comprising an active device comprising an FFD (Full Function Device) or an RFD (Reduced Function Device) configured to transmit at least one data packet within an MST (Maximum Sleep Time), the mobile node moving across PANs (Personal Area Networks);
   a plurality of sensor nodes configured to overlap a transmission range and configured to measure a moving direction of the mobile node wherein one of the sensor nodes is configured to measure a distance of the mobile node;
   a border node, at a periphery of the PANs, configured to detect a movement of the mobile node reaching to an inner region from an outer region of the respective PANs, and in response to detection of the mobile node within the inner region, to convert a quasi-sleep state of the border node into an active state, wherein a transceiver is turned-on from a quasi-sleep state and a beacon is transmitted to the mobile node in an active state, the beacon comprising a sensor node address and a PAN identifier; and
   a gateway being directly connected with at least one of the sensor nodes and corresponding to an intermediate point in response to detection of a communication of the mobile node and/or the at least one of the sensor nodes with an external device outside the PAN.

2. The system of claim 1, wherein the plurality of sensor nodes are configured to measure the distance based on an RSSI (Received Signal Strength Indication).

3. The system of claim 1, wherein at least one of the sensor nodes comprises an antenna array in order to measure the moving direction of the mobile node.

4. The system of claim 3, wherein the antenna array is configured to detect an AoA (Angle of Arrival) of the mobile node.

5. The system of claim 1, wherein one of the sensor nodes is configured to activate a next appropriate sensor node based on the moving direction of the mobile node for a handoff procedure when a link quality between the mobile node and the associated sensor node decreases under a predetermined threshold.

6. A system, comprising:
   a inner border node and outer border node arranged in a Personal Area Network (PAN) and configured to detect a movement of the mobile node reaching to the inner border node from the outer border node of the pan, to turn off a transceiver in a quasi-sleep state and to transmit a beacon in an active state to the mobile node, the outer node transmitting the beacon more frequently than the inner node;
   a mobile node configured to request the outer node or the inner node for an ID of the mobile node when data transmission is not occurred within an MST (Maximum Sleep Time); and
   a plurality of sensor nodes configured to overlap a transmission range and configured to measure a moving direction of the mobile node wherein one of the sensor nodes is configured to measure a distance of the mobile node.

7. The system of claim 6, wherein the mobile node is configured to determine whether the mobile node enters a new PAN when the beacon is received, and to transmit a join request message to a sensor node directly associated by the mobile node when the mobile node enters the new PAN.

8. The system of claim 7, wherein one of the sensor nodes is configured to measure the distance based on an RSSI (Received Signal Strength Indication).

9. The system of claim 8, wherein the mobile node comprising a speed sensor is configured to change the MST according to a movement speed measured by the speed sensor.

10. The system of claim 6, wherein the mobile node is configured to switch to a lost connection state when the mobile does not receive the beacon within a predetermined time after requesting the ID of the PAN.

11. The system of claim 6, wherein the one of the sensor nodes is configured to measure the distance to the mobile node based on an RSSI (Received Signal Strength Indication).

12. The system of claim 6, wherein the one of the sensor nodes comprises an antenna array in order to measure the moving direction of the mobile node.

* * * * *